(12) United States Patent
Neidermyer et al.

(10) Patent No.: US 9,509,847 B2
(45) Date of Patent: Nov. 29, 2016

(54) SYSTEM AND METHOD FOR LANGUAGE SPECIFIC ROUTING

(71) Applicant: INTERACTIVE INTELLIGENCE GROUP, INC., Indianapolis, IN (US)

(72) Inventors: Richard M. Neidermyer, Lititz, PA (US); David Johnston Lynch, Westfield, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 14/580,547

(22) Filed: Dec. 23, 2014

(65) Prior Publication Data

US 2016/0182722 A1    Jun. 23, 2016

(51) Int. Cl.
*H04M 1/64* (2006.01)
*H04M 3/00* (2006.01)
*H04M 5/00* (2006.01)
*H04M 3/523* (2006.01)
*H04M 3/493* (2006.01)

(52) U.S. Cl.
CPC ........... *H04M 3/5233* (2013.01); *H04M 3/493* (2013.01); *H04M 2203/2061* (2013.01); *H04M 2203/408* (2013.01); *H04M 2242/12* (2013.01)

(58) Field of Classification Search
CPC ...... G06Q 10/06; H04M 3/323; H04M 3/36; H04M 3/4285; H04M 3/42195; H04M 3/493; H04M 3/51; H04M 3/5166; H04M 3/5175; H04M 3/5183; H04M 3/523; H04M 5/5231; H04M 3/5232; H04M 3/5233; H04M 3/5237; H04M 3/5238; H04M 3/42221; H04M 2203/2011; H04M 2203/2061; H04M 2242/00; H04M 2242/08; H04M 2242/12
USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | | |
|---|---|---|---|---|
| 6,069,939 | A * | 5/2000 | Fung | H04M 3/4228 379/67.1 |
| 6,690,932 | B1 * | 2/2004 | Barnier | H04M 3/5233 379/45 |
| 7,913,063 | B1 * | 3/2011 | Lyerly | G06Q 10/06 379/265.12 |
| 2003/0043992 | A1 * | 3/2003 | Wengrovitz | H04M 7/009 379/229 |
| 2006/0023869 | A1 * | 2/2006 | Reynolds | H04M 3/493 379/265.12 |
| 2007/0172036 | A1 * | 7/2007 | Reynolds | H04M 3/493 379/88.06 |
| 2008/0084974 | A1 * | 4/2008 | Dhanakshirur | H04M 3/4936 379/88.18 |
| 2008/0273221 | A1 * | 11/2008 | Couchman | H04N 1/00209 358/1.15 |

(Continued)

OTHER PUBLICATIONS

International Search Report and Written Opinion of the International Searching Authority. Mailed Apr. 16, 2015 in related PCT Application PCT/US2014/072085 filed Dec. 23, 2014.
International Search Report and Written Opinion of the International Searching Authority. Mailed Apr. 22, 2015 in related PCT Application PCT/US2014/072085 filed Dec. 23, 2014.

(Continued)

*Primary Examiner* — Khai N Nguyen

(57) ABSTRACT

A system and method are presented for language specific routing. Language assignment may be used to efficiently route inbound interactions in a contact center. The inbound interaction's original location may be determined and assigned a language based on the location of the interaction. The interaction is assigned a language tag that can be referenced throughout routing. The interaction may be routed to the appropriate endpoints within the system based on the language tag.

38 Claims, 3 Drawing Sheets

(56) References Cited

U.S. PATENT DOCUMENTS

| | | | |
|---|---|---|---|
| 2009/0122965 A1* | 5/2009 | Reynolds | H04M 3/493 379/88.05 |
| 2011/0206190 A1* | 8/2011 | Reynolds | H04M 3/493 379/88.05 |
| 2012/0078609 A1* | 3/2012 | Chaturvedi | G06F 17/28 704/3 |
| 2012/0163563 A1* | 6/2012 | Reynolds | H04M 3/493 379/88.01 |
| 2012/0264395 A1* | 10/2012 | Bradburn | H04M 3/5233 455/404.1 |
| 2013/0156179 A1* | 6/2013 | Reynolds | H04M 3/493 379/265.12 |
| 2014/0348319 A1* | 11/2014 | Bouzid | G06F 9/44 379/265.09 |

* cited by examiner

SYSTEM AND METHOD FOR LANGUAGE SPECIFIC ROUTING

BACKGROUND

The present invention generally relates to telecommunications systems and methods, as well as communication routing in contact centers. More particularly, the present invention pertains to the language specific routing of inbound communications.

SUMMARY

A system and method are presented for language specific routing. Language assignment may be used to efficiently route inbound interactions in a contact center. The inbound interaction's original location may be determined and assigned a language based on the location of the interaction. The interaction is assigned a language tag that can be referenced throughout routing. The interaction may be routed to the appropriate endpoints within the system based on the language tag.

In one embodiment, a method is presented for routing an interaction utilizing language assignment, in a contact center operation system which comprises at least an interactive voice response system, interaction routing means, and a plurality of endpoints, comprising the steps of: receiving an inbound interaction by the contact center operation system wherein the inbound interaction is received at a first endpoint; determining the language assignment of the inbound interaction by the first endpoint, wherein the language assignment comprises a reference means; and routing the inbound interaction based on the reference means to an other endpoint in the contact center operation system.

In another embodiment, a method is presented for routing an interaction utilizing language assignment, in a contact center operation system which comprises at least an interactive voice response system, interaction routing means, and a plurality of endpoints, comprising the steps of: receiving an inbound interaction by the contact center operation system wherein the inbound interaction is received at a first endpoint of the plurality of endpoints in the contact center operation system; performing, by the first endpoint, the language assignment of the inbound interaction based at least in part on at least one of: the interaction's location of origin and the interaction's destination location, wherein the language assignment comprises a reference means; and routing the inbound interaction based on the reference means to a subsequent endpoint in the plurality of endpoints in the contact center operation system, wherein the reference means is reviewed by the system to determine other response routes.

DETAILED DESCRIPTION

Figure 1:
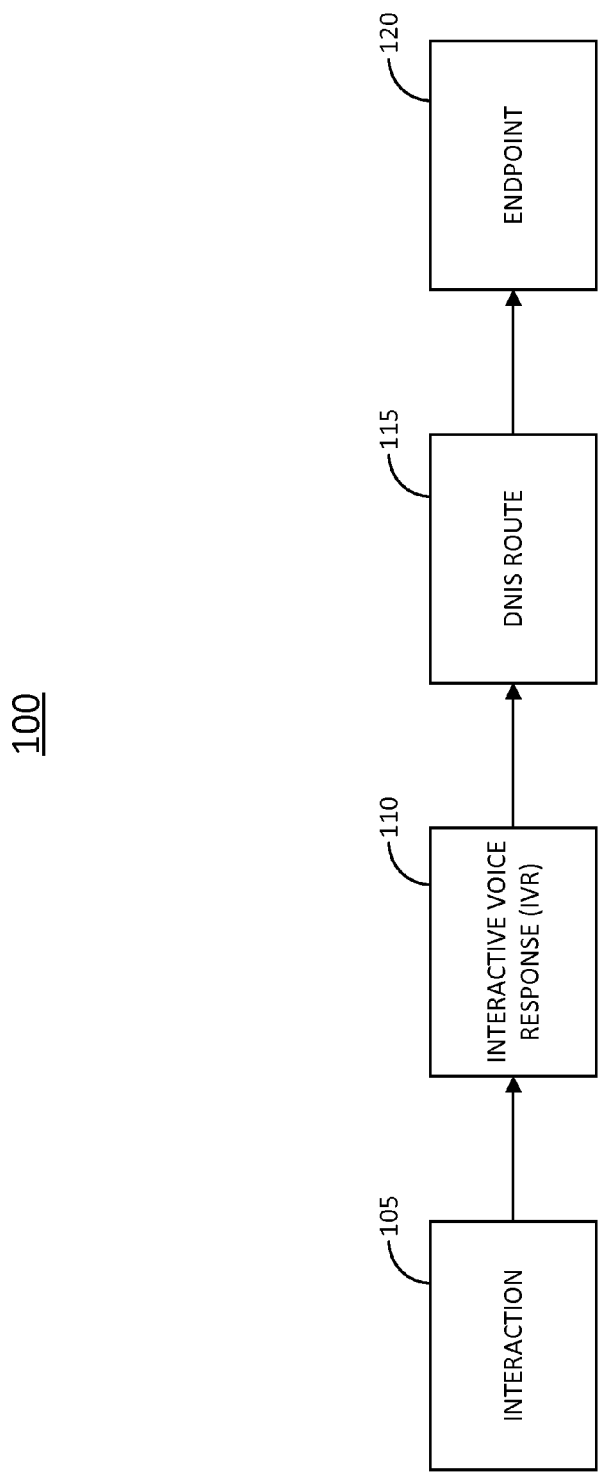
FIG. 1 is a diagram illustrating an embodiment of contact center routing.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a contact center, standard inbound interaction routing is based on the target of the interaction. Commonly, this is a Dialed Number Identification Service (DNIS) for an inbound telephony interaction. The interaction is typically routed and assigned a target based on the DNIS value. FIG. 1 illustrates an embodiment of standard inbound interaction routing indicated generally at 100. Components may include an Interaction 105, an IVR 110, a DNIS Route 115, and a number of Endpoints 120.

The Interaction 105 comprises an inbound interaction, such as a caller from a telephone or a message via SMS, to a contact center from a contact. Other forms of data streaming may also comprises inbound interactions, including but not limited to facsimile and video. The inbound interaction reaches the Interactive Voice Response (IVR) system 110 and the contact receives a language prompt in the system from the IVR 110. The IVR 110 is able to present the contact with general purpose content based on the originating contact's identity, such as the called identity. The originating contact's locality, however, is unknown to the system. The IVR 110 endpoint is required to either make general assumptions, or prompt the Contact 105 for more information in order to present customized content. The Contact 105 may be prompted for a specific language to continue with the interaction or opt-out of the IVR for an alternate language. The interaction proceeds along the DNIS route 115 until the desired Endpoint 120 is reached. Endpoints 120 Endpoints may comprise IVR, agents, prompts, etc. Any number of Endpoints 120 may be present and are within the scope of this disclosure, but for simplicity, only one is shown in the drawings.

Figure 2:
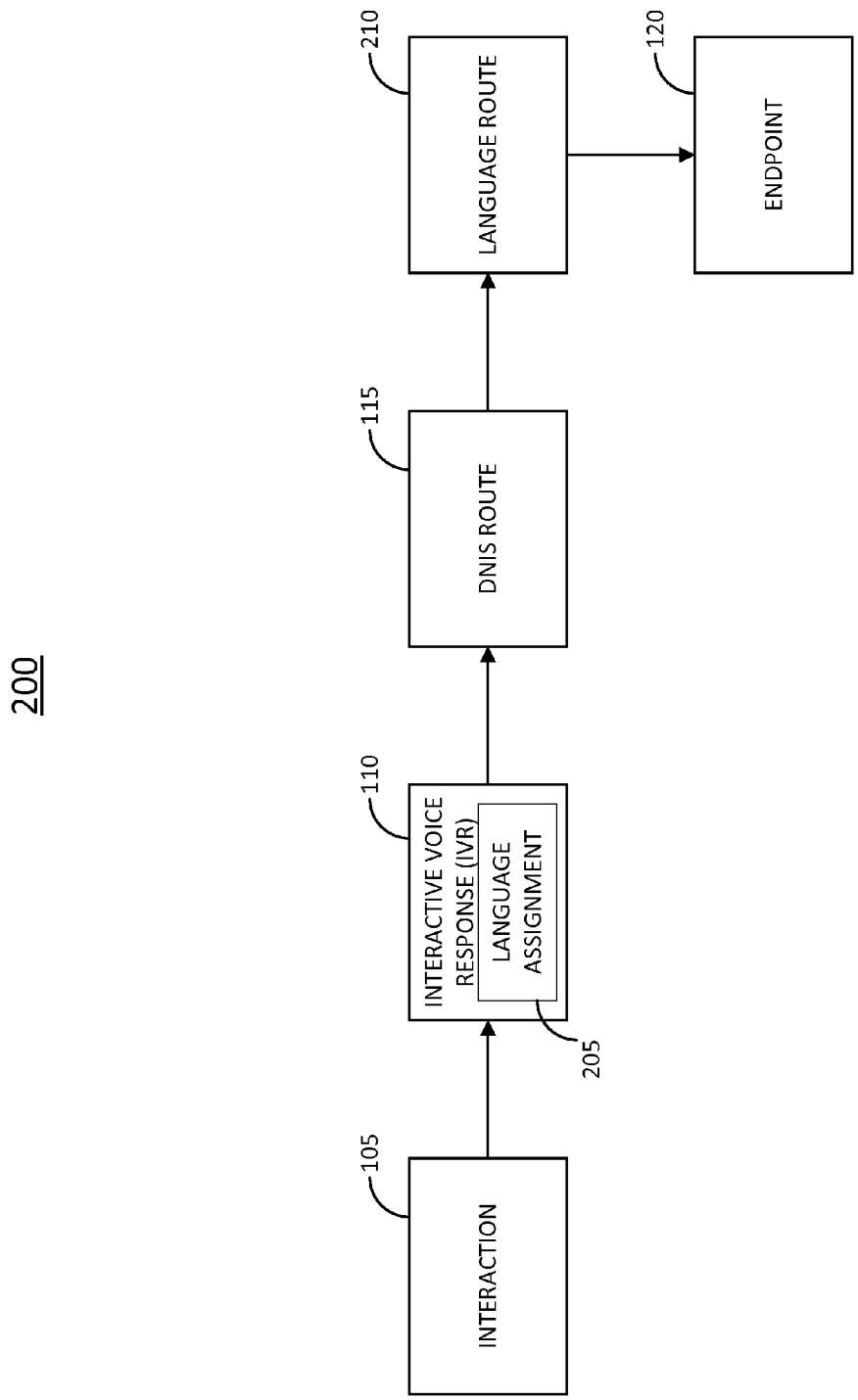
FIG. 2 is a diagram illustrating an embodiment of language specific contact center routing.

Conventional inbound interactions, such as voice calls and SMS, which are routed to system endpoints, may be routed in a more efficient method by the system determining the inbound interaction's original location without an IVR prompt. FIG. 2 is a diagram illustrating an embodiment of language specific contact center routing, indicated generally at 200. A language is assigned 205 to the interaction based on the originating location of the interaction when the interaction reaches the IVR. The interaction may then be subsequently routed to an endpoint based on this language assignment 210. In an embodiment, an endpoint may comprise any media function that requires a language indicator for appropriate communication.

Figure 3:
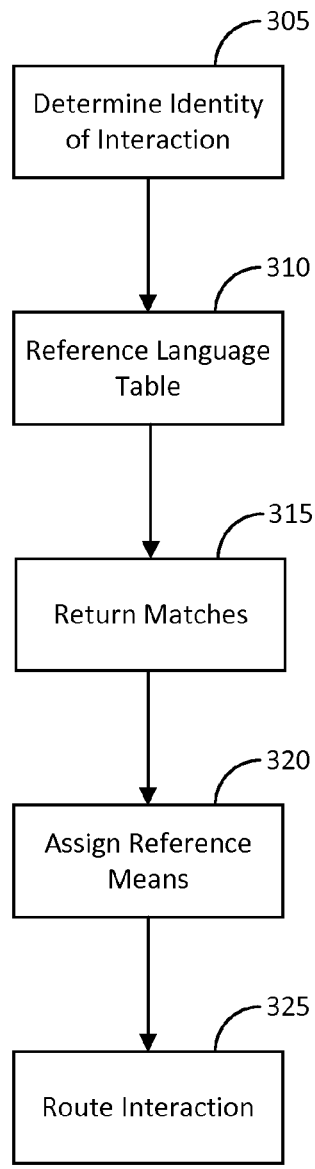
FIG. 3 is a flowchart illustrating an embodiment of a process for routing an interaction.

Language specific routing eliminates the requirement for a caller to provide additional information on an interaction to reach an appropriate endpoint, such as a language appropriate IVR. The overall interactive time with the call system is shortened while also providing a more streamlined and personal user experience. FIG. 3 illustrates an embodiment of a process for routing an interaction utilizing language assignment, indicated generally at 300. The language assignment 205 process 300 occurs at the point of the interaction reaching the initial system endpoint from the network, such as the IVR 110 in FIG. 2.

In operation 305, the calling identity is determined. In an embodiment, a call language assignment sources its inputs from the interaction's calling and called identity. The primary input is the calling identity, which may comprise the caller identification, ANI, or CLID, for example. The value may be provided by an interaction provider which could be a TELCO, SIP Carrier, or any service that is capable of delivering an interaction to any of the system's network endpoints. The caller identification may be provided in, but not limited to, the form of a telephony (TEL) or SIP address, for example. For example, Control is passed to operation 310 and process 300 continues.

In operation 310, the language table is referenced. For example, the call identity language table may accept as its input one or more caller identity input fields, such as call identity address. Given the caller identity input, the system may assign a means for reference, such as a language tag, to an interaction using the call identity language table for that interaction. The call identity language table may be hydrated from multiple sources of data, as described further below. Control is passed to operation 315 and process 300 continues.

In operation 315, matches are returned from the language table. The system returns the best possible language match given the input. In an embodiment, when a call identity address is used, the address is matched to its static entries to find an exact match. The table may also group a set of numbers based on the address' characteristics, such as country codes, region codes, etc., mapped to a specific language.

Multiple sources of information may be used to populate the call identity language table, including: static-primed database, dynamic-primed database, and dynamic database.

The static-primed database comprises data sourced from a database which maintains one-to-one address pairs to a language. It also maintains language pair matches to country codes and region codes for addresses that do not have an exact match.

The dynamic-primed database functions as an extension of the static-primed database. The system writes administrator assignments to the database adding new entries or overwriting existing entries. This provides the flexibility for an administrator to make specific assignments based on external knowledge or preference via configurations.

The Dynamic Database also functions as an extension of the static-primed database. In addition, the system writes user selections to the database adding new entries or overwriting existing entries. The user selections may come from user preference selections either entered by IVR response or live agent. The user language selection is stored as an exact match to the calling identity address in the database to be referenced the next time the same calling identity address reaches the system.

The call identity language table is capable of extension to allow for multiple language matches per call identity or call identity group. In an embodiment, multiple dialects of the same language in a similar geographical region may be handled. If a multiple match occurs, it would be necessary to be able to differentiate the options and choose the best one of which language tag to apply to the interaction. In another embodiment, multiple languages may be tagged to the interaction in an order of precedence. Potential algorithms for making such assignments include:

1) If multiple language tags are associated with the interaction, then prompt the user with that language set for user input selection.

2) Use the most recently used language within the language set. Most recently used is an attribute maintained within the call identity language table.

3) Use the most frequently used language within the language set. Most frequently used is an attribute maintained within the call identity language table. Most frequently used is defined as the language in the set that was used the most over a given number of references to that set.

4) Use the most recently used language within language set. If the system detects automated speech recognition failures, then re-queue the prompt sequence loading the next entry in the language set for the prompts and grammars. Control is passed to operation 320 and process 300 continues.

In operation 320, a reference means is assigned to the interaction. In an embodiment, the reference means may comprise a language tag. The language tag may be capable of being referenced throughout system routing and operation as necessary to determine how to route the interaction. Control is passed to operation 325 and process 300 continues.

In operation 325, the interaction is routed to an endpoint and the process ends. At each routable endpoint, the language tag is reviewed and may be used to serve the interaction with a language appropriate response route. Programmatically assigning and retrieving the language assignment allows the inbound interaction to immediately be routed to language specific endpoints on the system. The total system connect time is lowered and the user experience enhanced. A language specific route can terminate on any endpoint that customizes its response based on the interaction's language tag.

In an embodiment, the interaction may terminate into an IVR endpoint. Referencing the interaction's language tag, the IVR prompts are replayed in the given language. The IVR's automatic speech recognition is set to a collective of grammars for that language.

In another embodiment, the interaction may terminate into an ACD queue awaiting agent assignment. A key characteristic of that assignment is that the agent that receives the call should have the specific skill set required to handle the interaction. For example, the agent that receives the call must be able to speak the language defined by the interaction's language tag. If no agent is available with that language characteristic, the ACD queue may choose to request that the user with a language specific prompt select a second language offering or to receive a callback at a later time with an agent that fits the language profile.

In another embodiment, the interaction may terminate into an agent chat. The agent chat application accepts the language tag as an input and loads the appropriate translation tool to mediate between the interaction's language and the agent's language. An ACD queue may be used to distribute the interaction to an appropriate chat agent that is able to communicate in the assigned interaction language.

Examples may be applied to illustrate the concepts described above. In an embodiment, the system may receive telephone number +13175551234 ANI on a TDM voice call offered by the telephony provider. A call identity language table lookup is performed on the telephone number. The results of the lookup may include an en-US language tag. Interaction routing means, such as DID routing, routes the interaction to system IVR service. IVR service reads the interaction's language tag as en-US. The IVR service then loads prompts and grammar sets tailored to the form of English spoken in the United States for interaction with the caller.

In another embodiment, the system receives sips:+14185551234 ANI on a TDM voice call offered by the telephony provider. A call identity language table lookup is performed on the telephone number. The results of the lookup may include a fr-CA language tag. DID routing, for example, routes the interaction to the system ACD queue.

The ACD queue reads the interaction's language tag as fr-CA. The ACD queue then transfers the interaction to a French speaking agent.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for routing an interaction utilizing language assignment, in a contact center operation system which comprises at least an interactive voice response system, interaction routing means, and a plurality of endpoints, comprising the steps of:
   a. receiving an inbound interaction by the contact center operation system wherein the inbound interaction is received at a first endpoint;
   b. determining the language assignment of the inbound interaction by the first endpoint, wherein the language assignment comprises a reference means;
   c. routing the inbound interaction based on the reference means to an other endpoint associated with the reference means in the contact center operation system; and
   d. reviewing the reference means by the contact center operation system to determine other response routes based on the reference means, wherein the interaction is routed to an other endpoint associated with the reference means.

2. The method of claim 1, wherein the reference means comprises a language tag.

3. The method of claim 2, wherein the language tag is capable of review by the contact center operation system, at each routable endpoint, to determine an appropriate response route.

4. The method of claim 1, wherein the language assignment determination sources inputs from an identity of the interaction.

5. The method of claim 4, wherein the identity of the interaction comprises at least one of: caller identification and called identification.

6. The method of claim 5, wherein the caller identification comprises one of: telephone or Session Initiation Protocol address.

7. The method of claim 5, wherein the called identification comprises at least one of: telephone and Session Initiation Protocol address.

8. The method of claim 4, wherein the identity of the interaction is provided by an interaction provider.

9. The method of claim 8, wherein the interaction provider comprises service capable of delivering an interaction to at least one of the plurality of endpoints in the contact center operation system.

10. The method of claim 4, wherein the identity of the interaction comprises a language table.

11. The method of claim 10, wherein the language table is referenced to assign language tags using at least one match made through one of: static entries and a set of numbers based on address characteristics mapped to a given language.

12. The method of claim 11, wherein the address characteristics comprise country codes.

13. The method of claim 11, wherein the address characteristics comprise region codes.

14. The method of claim 1, wherein the other endpoint comprises at least one of: an Interactive Voice Response system, an agent, and an agent chat.

15. The method of claim 1, wherein the first endpoint comprises an Interactive Voice Response system prompt.

16. The method of claim 1, wherein the interaction comprises a voice call.

17. The method of claim 1, wherein the interaction comprises short-message-service.

18. The method of claim 1, wherein the interaction comprises facsimile.

19. The method of claim 1, wherein the interaction comprises video.

20. The method of claim 1, wherein the first endpoint and a subsequent endpoint are part of the plurality of endpoints in the contact center operation system, and further comprising the step of:
   a. performing by the first endpoint, the language assignment of the inbound interaction based at least in part on at least one of the interaction's location of origin and the interaction's destination location, wherein the language assignment comprises the reference means.

21. The method of claim 20, wherein the reference means comprises a language tag.

22. The method of claim 21, wherein the language tag is capable of review by the contact center operation system, at each routable endpoint, to determine an appropriate response route.

23. The method of claim 20, wherein the language assignment sources inputs from a call identity of the interaction.

24. The method of claim 23, wherein the call identity comprises at least one of: caller identification and called identification.

25. The method of claim 24, wherein the caller identification comprises one of: telephone or Session Initiation Protocol address.

26. The method of claim 24, wherein the called identification comprises at least one of: telephone and Session Initiation Protocol address.

27. The method of claim 23, wherein the call identity is provided by an interaction provider.

28. The method of claim 26, wherein the interaction provider comprises service capable of delivering an interaction to at least one of the plurality of endpoints in the contact center operation system.

29. The method of claim 23, wherein the call identity comprises a language table.

30. The method of claim 29, wherein the language table is referenced to assign language tags using at least one match made through one of: static entries and a set of numbers based on address characteristics mapped to a given language.

31. The method of claim 30, wherein the address characteristics comprise country codes.

32. The method of claim 30, wherein the address characteristics comprise region codes.

33. The method of claim 20, wherein the plurality of endpoints comprises at least one of: an Interactive Voice Response system, an agent, and an agent chat.

34. The method of claim 20, wherein the first endpoint comprises an Interactive Voice Response system prompt.

35. The method of claim 20, wherein the interaction comprises a voice call.

36. The method of claim 20, wherein the interaction comprises short-message-service.

37. The method of claim 20, wherein the interaction comprises facsimile.

38. The method of claim 20, wherein the interaction comprises video.

\* \* \* \* \*